Nov. 22, 1932.                H. FROMM                1,888,915
                            JUICE EXTRACTOR
                          Filed Feb. 27, 1931
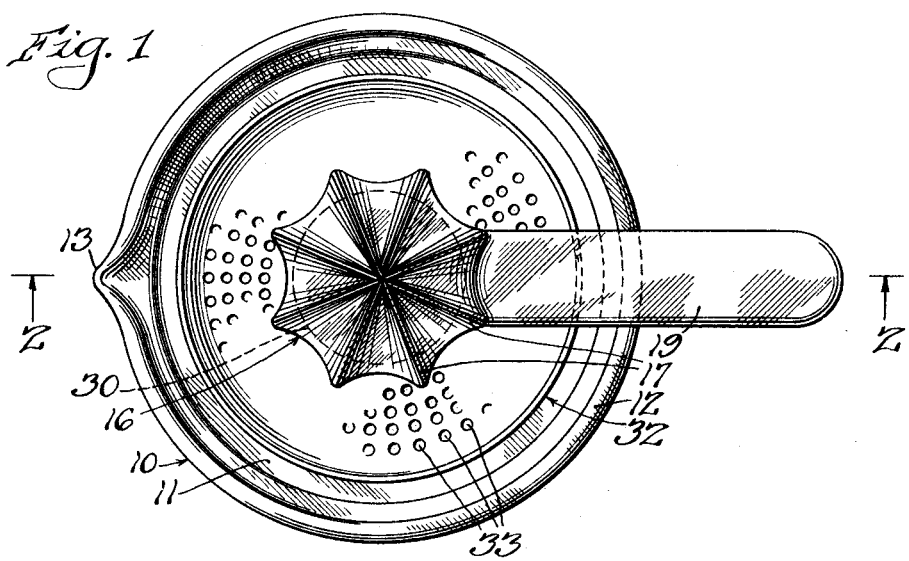
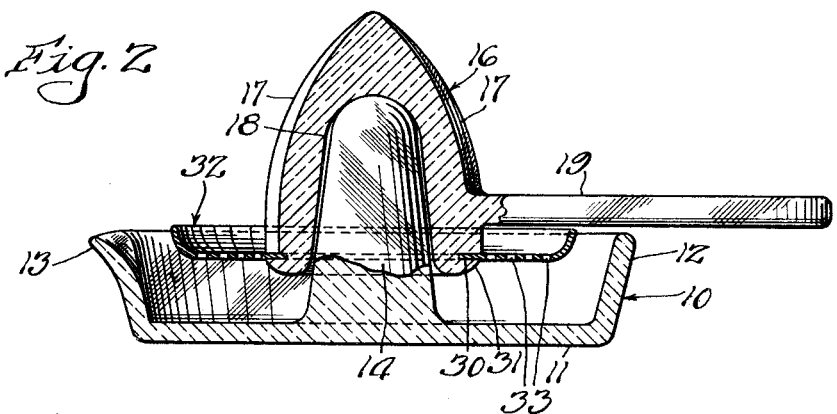
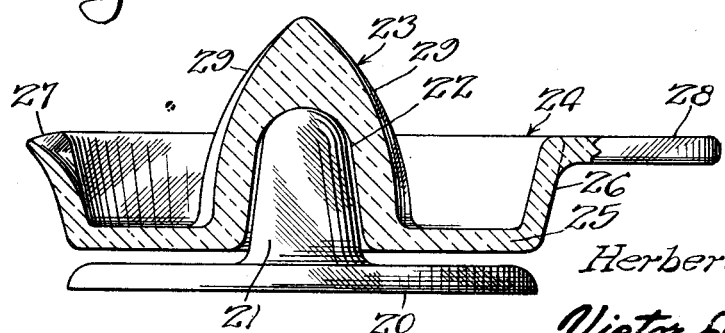
Herbert Fromm
INVENTOR:
Victor J. Evans & Co.
HIS ATTORNEYS Patented Nov. 22, 1932

1,888,915

UNITED STATES PATENT OFFICE

HERBERT FROMM, OF HAMBURG, WISCONSIN

JUICE EXTRACTOR

Application filed February 27, 1931. Serial No. 518,835.

This invention relates to certain novel improvements in juice extractors, and has for its principal object the provision of an improved construction of this character which will be highly efficient in use and economical in manufacture.

The salient object of this invention is to provide an improved juice extractor for fruits or the like such, for example, as lemons, oranges, etc.

Another object of the invention is to provide an extractor in which a dome-like head or reamer having a handle attached thereto is mounted for oscillatory movement on a bearing upstanding from a receptacle in which the juice is collected so that by holding a half portion of the fruit in one hand and oscillating the reamer or head by means of the handle the extraction of the juice will be facilitated.

A further object of the invention is to provide a juice extractor in which a dome-like head or reamer is formed integral with a juice collecting receptacle that carries a handle and the reamer or head is recessed to receive and is detachably mounted upon a bearing upstanding from a base, so that by grasping the handle in one hand the reamer or head and receptacle may be oscillated to extract the juice from the half portion of the fruit held in the other hand, after which the receptacle may be lifted from the bearing to empty the juice collected on the receptacle.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a top plan view of a preferred form of construction of the invention;

Fig. 2 is a sectional view on the line 2—2 of Fig. 1; and

Fig. 3 is a sectional view of a modified form of construction of the invention.

Referring particularly to Figs. 1 and 2, a receptacle formed of suitable material such, for example as glass or metal, is indicated at 10 and includes a base 11 and a side wall 12 having a spout 13 formed therein. Upstanding from the base 11 is a bearing post 14, integral with the base, and of any suitable material such as, for example, glass or metal.

A dome-like head or reamer is indicated at 16 and has corrugations or ribs 17 on the periphery thereof. This head or reamer 16 is recessed, as at 18, to receive the bearing post 14, and integral with the head 16 is a handle 19.

Adjacent the bottom the reamer 16 has a peripheral recess 30 formed therein and in this recess is disposed a flange 31 of a strainer 32 which is suitably perforated, as at 33, and the flange 31 is secured to the reamer 16 in the recess 30 in any suitable manner so that when the reamer 16 is oscillated by means of handle 19 the strainer 32 will oscillate therewith and this oscillating motion of the strainer will facilitate the separation of the juice from the pulp and seed of the fruit.

In use the half portion of a fruit or like object will be held upon the head or reamer 16 with one hand and the handle 19 will be grasped with the other hand and the head or reamer 16 oscillated back and forth so that the ribs 17 will extract the juice from the half portion of fruit, and the juice will run down the reamer, through the perforations 33 of the strainer 32 and into the dish 10. The head 16 and strainer 32 will then be lifted off the bearing post 14 and the dish 10 lifted to pour the juice out of the spout 13.

In Figure 3, a modified form of construction of the invention is illustrated, and in this instance I provide a base 20 of suitable material which may be, for example, glass or metal, and upstanding from this base 10 is a bearing post 21 which fits into a recess 22 in the dome-like head or reamer 23 that is formed integrally with a dish or receptacle 24 that includes a base 25, side wall 26, pouring spout 27, and handle 28. In the use of the invention, as depicted in Fig. 3, the half fruit portion will be held over the reamer or head 23 and the dish 24 will be rotated on bearing post 21 by means of handle 28 so that the ribs 29 will extract juice from the half portion.

Therefore, the reamer 23 will be lifted from the bearing 21 and the juice poured out of spout 27.

A strainer such as 32 may, if desired, be mounted on the reamer 23 in the manner in which the strainer 32 is mounted on the reamer 16, or in any other suitable manner.

The present invention, as will be seen from the foregoing description, provides a simple economical and efficient improvement over the now commonly used juice extractors.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention, what I claim as new, and desire to protect by Letters Patent is:

A juice extractor comprising a receptacle, an upstanding bearing post on the receptacle, a dome-like reamer having a recess formed on its under side to receive the bearing post, a strainer carried by and rotatable with said reamer, and a handle integral with the reamer for oscillating the reamer and strainer on the bearing post, the juice extracted thereby passing through said strainer and being collected in said receptacle.

In testimony whereof I affix my signature.

HERBERT FROMM.